Dec. 14, 1965   D. B. CLARK ET AL   3,223,225
COLLISION PREVENTION SYSTEM
Filed Sept. 25, 1962   3 Sheets-Sheet 1

INVENTORS:
DAVID B. CLARK &
LAWRENCE W. LANGLEY
BY James G. Williams
THEIR ATTORNEY

United States Patent Office 3,223,225
Patented Dec. 14, 1965

3,223,225
COLLISION PREVENTION SYSTEM
David B. Clark and Lawrence W. Langley, Waynesboro, Va., assignors to General Electric Company, a corporation of New York
Filed Sept. 25, 1962, Ser. No. 226,087
6 Claims. (Cl. 198—37)

The invention relates to a collision prevention system, and particularly to a collision prevention system for use with a plurality of conveyors which carry articles to a common point or to a common conveyor.

In certain applications, such as warehousing, conveyors in the form of moving belts may be used to convey articles from one place to another. Frequently, one conveyor carrying articles merges with a second conveyor also carrying articles. Or, two or more conveyors each carrying articles may merge at a common point where the articles are carried away by a single common conveyor. At the point of merging, there is the possibility of a collision between two articles. Such a collision may disrupt the orderly flow of articles, or may damage the articles, or may knock the articles off the conveyor.

Therefore, an object of the invention is to provide a system that prevents articles from colliding.

Another object of the invention is to provide a system that prevents articles from colliding, where such articles are merging at a common point at the same time.

Another object of the invention is to provide a collision prevention system that detects whether merging articles may have a collision, and that provides a signal which can be used to retard one of the articles so as to prevent such a collision.

Briefly, these and other objects of the invention are attained by article detecting means which are respectively positioned beside each of the conveyors ahead of the merging point. If two of the article detecting means provide indications which are simultaneous or which overlap, a signal is produced which can be used to retard or delay the later of the two articles for sufficient time to prevent their collision. Or, in accordance with another embodiment of the invention, a signal is produced which can be used to speed up or accelerate the earlier of the two articles for sufficient time to prevent their collision.

The invention may be better understood from the following description given in connection with the accompanying drawing, and the scope of the invention will be pointed out in the claims. In the drawing:

Figure 1:
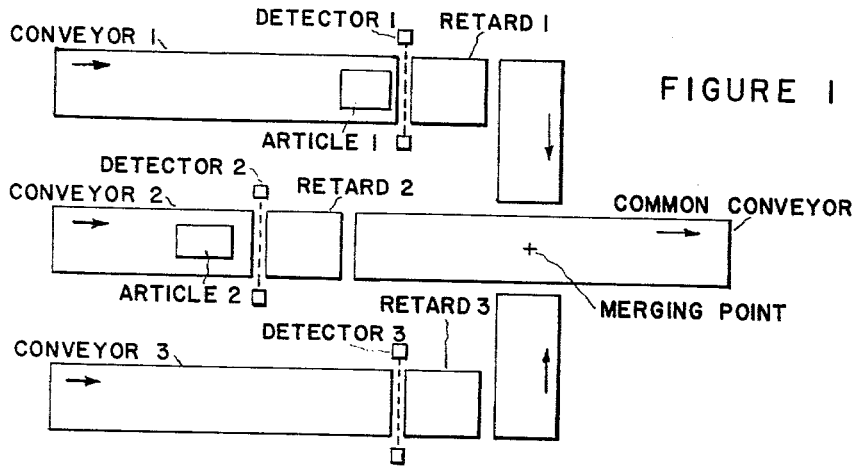
FIGURE 1 shows a plan view of a conveyor with which the invention may be used.

The plan view of FIGURE 1 shows a conveyor which might be used in a typical warehousing operation. This conveyor includes three individual conveyors 1, 2, and 3 which merge or lead into a common conveyor. All the conveyors may be powered by suitable means such as electric motors. While the individual and common conveyors of FIGURE 1 are positioned at a common level, the conveyors may be positioned at different levels, or in other configurations. Each of the three individual conveyors is provided with respective retard sections 1, 2, and 3. When actuated, the retard sections slow down or stop an article between the individual conveyors and the common conveyor. This slowing down or stopping may be accomplished by any suitable means such as an electric motor which is slowed down or stopped for the necessary length of time. Each of the three individual conveyors is also provided with respective article detectors 1, 2, and 3. Such an article detector indicates the presence of an article by any suitable device such as a photoelectric relay which is normally energized by a light source, but which becomes deenergized by the presence of an article between the light source and the photoelectric relay. The article detectors are respectively positioned just ahead of the retard sections to recognize the possibility of collision between two or more articles at the merging point on the common conveyor. If the individual conveyors are all traveling at substantially the same speed, the article detectors will all be positioned substantially the same distance ahead of the merging point. However, if the individual conveyors are traveling at different speeds, the article detectors will be positioned at different distances ahead of the merging point to compensate for this difference in speeds of the individual conveyors. Expressed mathematically, the article detectors are positioned at respective distances ahead of the merging point on the common conveyor so that the ratios of respective distances to the individual conveyor speeds are substantially constant.

Figure 2:
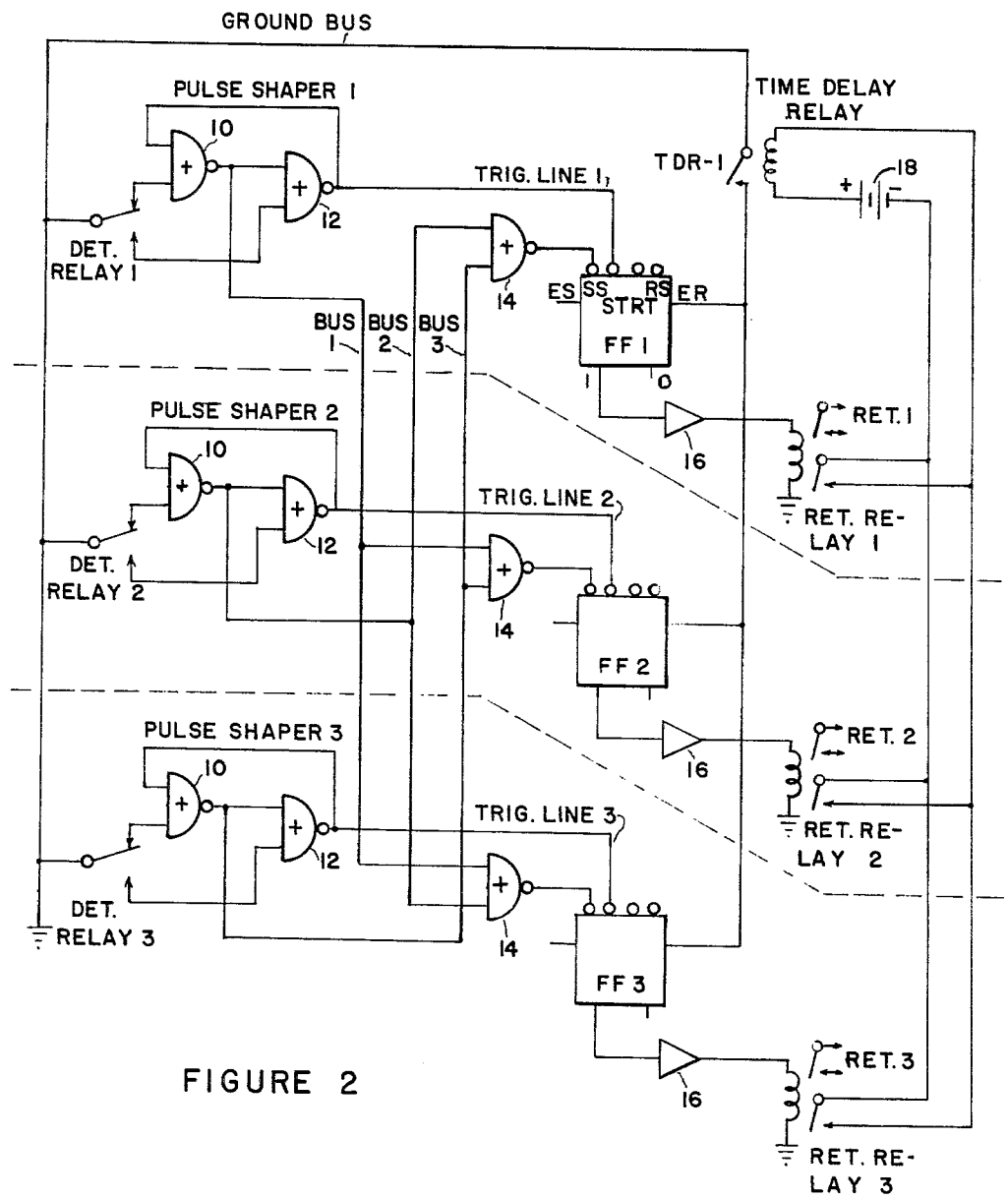
FIGURE 2 shows a schematic diagram of a preferred embodiment of the collision prevention system of the invention.

FIGURE 2 shows a schematic diagram of a preferred form of the invention for use with the conveyor of FIGURE 1. Since there are three individual conveyors shown in FIGURE 1, the diagram of FIGURE 2 shows three associated schematic sections separated by dashed lines. If the conveyor of FIGURE 1 had additional individual conveyors, then the diagram of FIGURE 2 would have additional schematic sections. In FIGURE 2, the conditions of the article detectors 1, 2, and 3 are indicated by relay contacts labeled detector relay 1, detector relay 2, and detector relay 3. The movable detector relay contacts are connected to a reference potential such as a ground bus. Each of the movable contacts engages its upper fixed contact in the absence of an article. In the presence of an article, the appropriate movable detector relay contact indicates this presence by moving downward and engaging its lower fixed contact. The fixed contacts are respectively coupled to pulse shapers 1, 2, and 3, which may take a number of forms or which may be omitted. As shown, each pulse shaper includes two interconnected NOR gates 10, 12. The outputs of the NOR gates 10 are respectively coupled to buses 1, 2, and 3. The buses 1, 2, and 3 are connected to NOR gates 14 each bus being connected to all (i.e., two in this example) NOR gates 14 except its one associated NOR gate. The outputs of the NOR gates 12 are respectively coupled to trigger lines 1, 2, and 3. These trigger lines 1, 2, and 3 are respectively coupled to steered flip-flops FF1, FF2, and FF3.

The schematic diagram shown in FIGURE 2 utilizes digital logic techniques. There are many publications describing such techniques, one being a book entitled "Design of Transistorized Circuits For Digital Computers" by A. I. Pressman, John F. Ryder Publisher, Inc., New York, 1960. This book discloses a number of actual circuits for accomplishing the logic functions of gate circuits and steered flip-flops. Each of the NOR logic gates shown in FIGURE 2 is a two input OR gate with inversion at its output. In logic terms, a NOR gate produces a logic 0 (a positive voltage in this discussion) at its output if any one of its inputs is at a logic 1 (zero volts in this discussion). The operation of such a logic gate is explained in the book mentioned above, particularly at pages 114 through 144. The flip-flop FF1, FF2, and FF3 are also described in the book mentioned at pages 278 through 307. Outputs from the flip-flops shown in FIGURE 2 are taken from terminals 1 and 0. When a flip-flop is in the set condition, its terminal 1 is at a logic 1 and its terminal 0 is at a logic 0. When the flip-flop is in the reset condition, its terminal 1 is at a logic 0 and its terminal 0 is at a logic 1. The flip-flops may be controlled by a number of inputs including a set steering input SS, a reset steering input RS, a set input ES, a reset input ER, a set trigger input ST, and a reset trigger input RT. A logic 1 at the set or reset inputs ES or RS respectively sets or resets the flip-flop for the duration of the logic 1, and subsequently if no further signals are applied to the flip-flop. A logic 0 at the set or reset steering inputs SS or RS ahead of and during a trigger pulse permits the flip-flop to be set or reset by a trigger pulse change from a logic 1 to a logic 0 at the appropriate trigger inputs ST or RT. The flip-flop remains so set or reset after removal of these two signals and until further signals are applied to the flip-flop. The designations of the inputs or outputs have been shown only for the flip-flop FF1. However, the flip-flops FF2 and FF3 have comparable inputs and outputs. Where there are omissions to the inputs or outputs, such inputs or outputs are not needed. Therefore other logic elements may conceivably be utilized in place of the flip-flops.

The outputs of the NOR gates 14 are respectively coupled to the set steering inputs SS of the three flip-flops FF1, FF2, and FF3. The inputs of the NOR gate 14 associated with flip-flop FF1 are coupled to buses 2 and 3. The inputs of the NOR gate 14 associated with flip-flop FF2 are coupled to buses 1 and 3. And the inputs of the NOR gate 14 associated with flip-flop FF3 are coupled to buses 1 and 2. Each output terminal 1 of the flip-flops is coupled through a suitable amplifier 16 to a respective retard relay. Each of the retard relays has a first set of normally open contacts which are coupled in parallel. These first sets of contacts are coupled to a suitable source 18 of direct current and a time delay relay winding. Each of the retard relays also has a second set of normally open contacts which, as indicated, are to be respectively coupled to suitable circuitry (not shown) to slow down or stop the retard sections of the conveyor of FIGURE 1. As will be explained hereinafter, a retard relay will be energized if any one of the buses not associated with that retard relay is at a logic 1; and if a subsequent trigger of logic 0 is applied to the set trigger input ST of the flip-flop associated with that retard relay. The time delay relay has a set of normally open contacts TDR-1 which are coupled in series between the ground bus and each of the reset inputs ER of the flip-flops FF1, FF2, and FF3. The time delay relay has a characteristic such that after it is energized, its contacts TDR-1 do not close until a predetermined length of time has expired.

Figure 3:
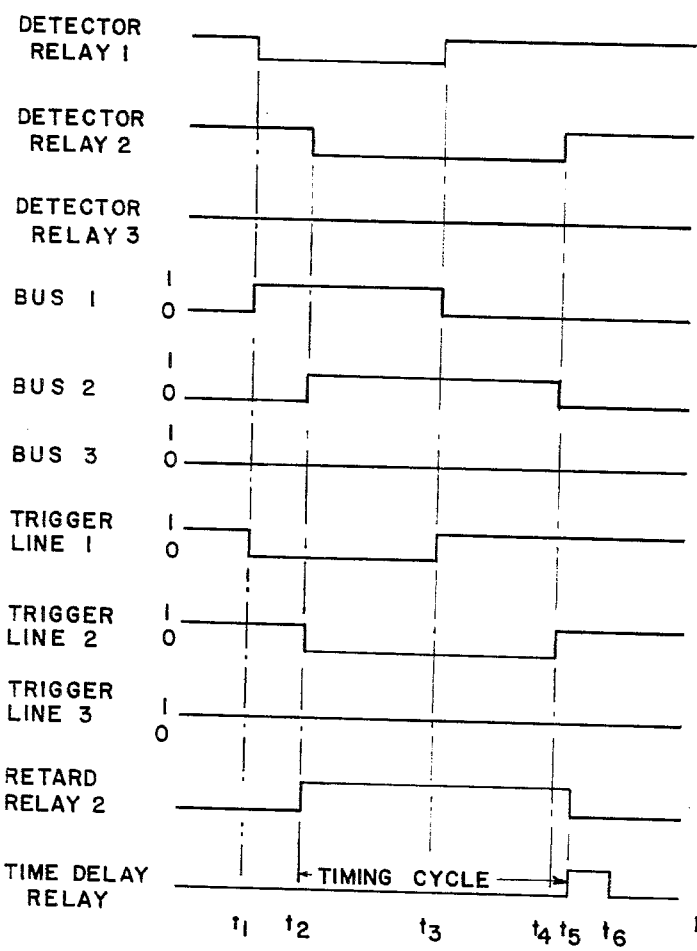
FIGURE 3 shows waveforms for explaining the operation of the system of FIGURE 2.

The operation of the collision prevention system shown in FIGURE 2 will be explained by an example of two articles which are shown on the individual conveyors 1 and 2 in FIGURE 1. This explanation will be made in connections with the waveforms which are shown in FIGURE 3 plotted along a common time axis. In the example assumed, the three individual conveyors are moving at the same speed. Article 1 (on conveyor 1) intercepts or is detected by detector 1 just slightly ahead of the time that an article 2 (on conveyor 2) intercepts or is detected by detector 2. Although article 2 is slightly behind article 1, the two articles will collide. If article 2 is retarded, this collision will be prevented. The following explanation will refer to both FIGURES 2 and 3.

Prior to time $t_1$, the buses 1, 2, and 3 are all at logic 0 and the trigger lines 1, 2, and 3 are all at logic 1. The flip-flops FF1, FF2, and FF3 are in the reset condition. At time $t_1$, article 1 is detected by detector 1 as indicated by the waveform for detector 1. The contacts of detector 1 remove the ground bus (logic 1) from the NOR gate 10 and connect the ground bus (logic 1) to the NOR gate 12 of pulse shaper 1. A logic 1 at the input of the NOR gate 12 produces a logic 0 on trigger line 1. Both inputs of the NOR gate 10 are now at a logic 0, and therefore the output of the NOR gate 10 becomes a logic 1. Therefore bus 1 is at a logic 1. This is the first condition for energizing one of the retard relays, in this case retard relay 2 or 3. At time $t_2$, the article 2 is detected by detector 2 as indicated by the waveform for detector 2. (Thus beginning at time $t_2$ and until time $t_3$, articles 1 and 2 are simultaneously detected.) The contacts of detector 2 remove the ground bus from the NOR gate 10 and connect the ground bus to the NOR gate 12 of pulse shaper 2. Bus 2 becomes a logic 1. But more significantly, trigger line 2 changes from a logic 1 to a logic 0. This is the second condition for energizing one of the retard relays, in this case retard relay 2. That is, a logic 1 on bus 1 is changed to the required logic 0 at the set steering input SS of the flip-flop 2, and this is followed by the logic 1 to 0 change on trigger line 2 so as to set the flip-flop FF2. When the flip-flop FF2 is set, the retard relay 2 is energized as indicated at time $t_2$. The retard relay 2 operates circuitry to slow down or stop the retard section 2 so as to delay article 2. Also, the time delay relay begins its timing cycle. This timing cycle is selected to be longer than the length of time required for the longest article at its slowest speed to pass a detector. Since article 2 does not pass by detector 2 until time $t_4$, the timing cycle is longer than the time between times $t_2$ and $t_4$.

At time $t_3$, article 1 passes by its detector 1 as indicated by its associated waveform. Bus 1 returns to a logic 0, and trigger line 1 returns to a logic 1. At time $t_4$, article 2 passes by its detector 2. Bus 2 returns to a logic 0 and trigger line 2 returns to a logic 1. At time $t_5$, the time delay relay picks up and closes its associated contacts TDR-1. At this time, the ground bus (logic 1), is coupled to the reset input ER of the flip-flops, thus resetting any flip-flop (especially flip-flop FF2) which may be set. When flip-flop FF2 is reset, the retard relay 2 is deenergized. When retard relay 2 is deenergized, the time delay relay is likewise deenergized and, depending upon its time constant, drops out or opens at some time $t_6$. At time $t_6$, all of the circuits are returned to their normal position, and are ready to provide another collision prevention signal.

If, after time $t_2$ and before time $t_4$, another article had been detected (simultaneously with the detection of articles 2 or 3 or articles 2 and 3), such a detection would provide a logic 0 to the set trigger input ST of the flip-flop associated with the article detector. Thus, an appropriate retard relay would be energized to retard the article so detected.

Figure 4:
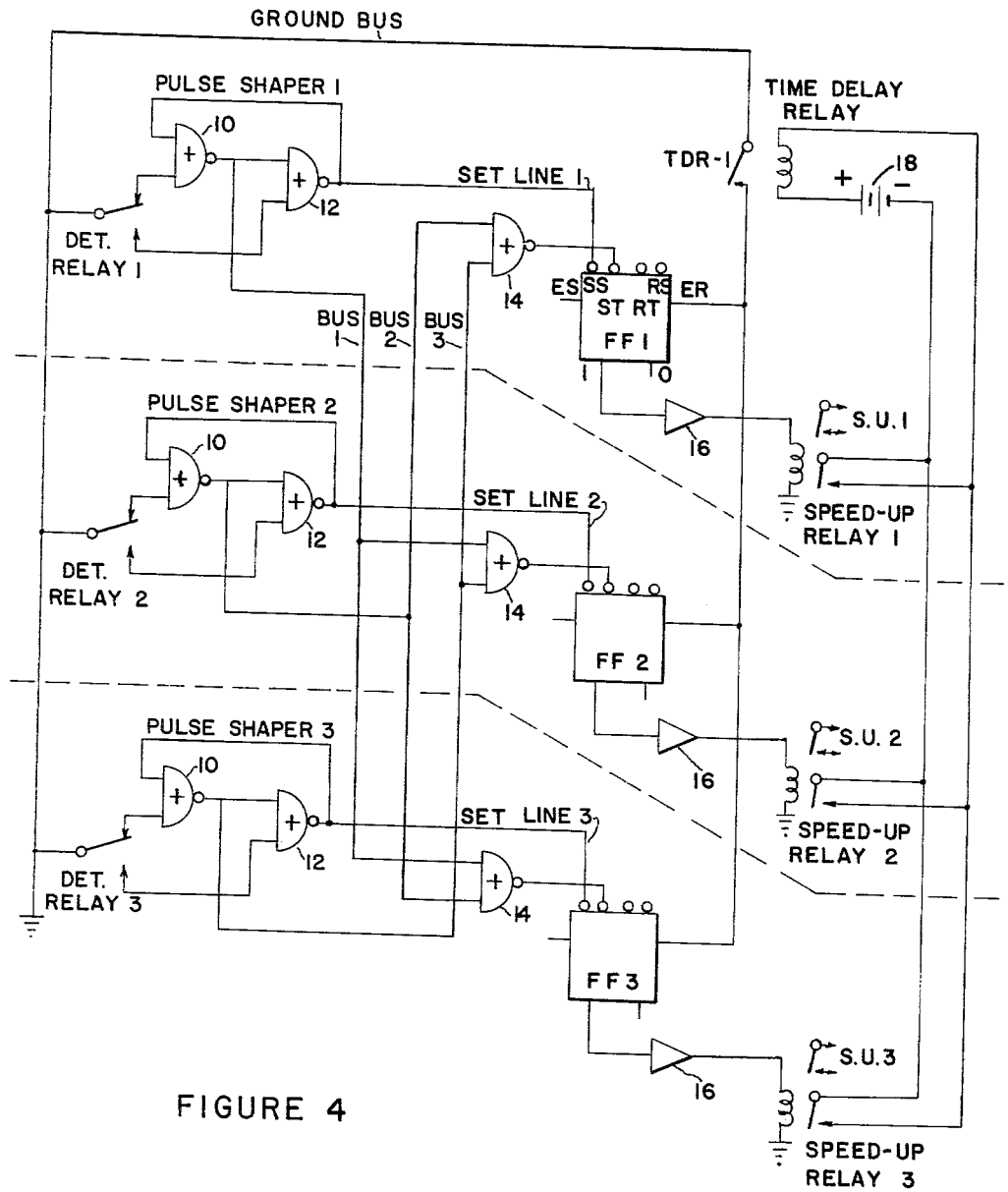
FIGURE 4 shows a schematic diagram of another embodiment of the collision prevention system of the invention.

FIGURE 4 shows a schematic diagram of another embodiment of the invention. The diagrams of FIGURES 2 and 4 are almost identical. The elements or components of FIGURE 4 have been given the same reference numerals as the corresponding elements or components of FIGURE 2. The only differences between the diagrams of FIGURE 4 and FIGURE 2 are that the lines to the set steering inputs SS and set trigger inputs ST of the flip-flops FF1, FF2, and FF3 have been reversed. Thus, the outputs of the three NOR gates 12 are respectively coupled to a set line 1, a set line 2, and a set line 3. These set lines are respectively coupled to the set steering inputs SS of flip-flops FF1, FF2, and FF3. The outputs of the three NOR gates 14 are respectively coupled to the set trigger inputs ST of flip-flops FF1, FF2, and FF3. The operation of the embodiment of FIGURE 4 is similar to the operation of the embodiment of FIGURE 2. However, in FIGURE 4, the signal provided is intended to be used to speed up or accelerate the earlier of two detected articles.

The example assumed in the explanation of FIGURE 2 will also help to illustrate the operation of the diagram of FIGURE 4. In that example, an article 1 was detected on conveyor 1 just prior to an article 2 being detected on conveyor 2. Since article 1 is only slightly ahead of article 2, the two articles will collide. This collision will be prevented if article 1 is sped up or accelerated by the energization of speed-up relay 1. The speed-up relay 1 will be energized if the set steering input SS of the flip-flop FF1 is at a logic 0; and if a subsequent trigger of logic 0 is applied to the set trigger input ST of the flip-flop FF1. When article 1 is detected, the movable contact of the detector relay 1 moves down to apply a logic 1 to the input of the NOR gate 12. The output of the NOR gate 12 and the set line 1 change from a logic 1 to a logic 0. This change provides set steering for the flip-flop FF1, and is the first condition for energizing the speed-up relay 1. When article 2 on conveyor 2 is detected, the output of the NOR gate 10 of the pulse shaper 2 changes from a logic 0 to a logic 1. This logic 1 on bus 2 is applied to the NOR gate 14, so that the output of the NOR gate 14 changes from a logic 1 to a logic 0. This logic 0 is coupled to the set trigger input ST of flip-flop FF1, and is the second condition for energizing the speed-up relay 1. The flip-flop FF1 changes to the set condition, i.e., with its terminal 1 at a logic 1. This logic 1 is suitably amplified by the amplifier 16 to energize the speed-up relay 1. When the speed-up relay 1 is energized, it can speed up or accelerate article 1 on conveyor 1 by means (not shown) so that article 1 is advanced sufficiently far to prevent collision between article 1 and article 2. Operation of the speed-up relay 1 also energizes the time delay relay 1 which, after the predetermined length of time, closes its contacts TDR-1 to reset the circuit as previously described.

Thus, the schematic diagrams of FIGURES 2 and 4 are very similar. The diagram of FIGURE 2 can be used for retarding the later of two detected articles, while the diagram of FIGURE 4 can be used to speed up or accelerate the earlier of two detected articles.

It will thus be seen that the invention provides a new and improved collision prevention system particularly for use with article conveyors. Although a preferred embodiment utilizes logic and digital techniques such as shown in FIGURES 2 and 4, it is to be understood that other techniques for providing the operation may be utilized. Also, the system can be used with any number of individual conveyors by appropriate addition of logic elements. Therefore, while the invention has been described with reference to a particular embodiment, it is to be understood that modifications may be made without departing from the spirit of the invention or from the scope of the claims.

What we claim as new and desire to secure by Letters Patent of the United States is:

1. In a system for supplying articles to a common point by means of a plurality of conveying means each moving at a respective speed, the improvement comprising article detecting means associated with each of said conveying means for indicating the presence of an article at predetermined distances ahead of said common point, the respective ratios of said distances to said speeds being equal, means coupled to said article detecting means for indicating the simultaneous detection of a plurality of said articles, and means coupled to said indicating means for retarding all but the first of said detected articles only in response to said simultaneous detection of articles.

2. In a system for supplying articles to a common point by means of a plurality of conveying means each moving at a respective speed, the improvement comprising respective article detecting means for producing a signal in response to the presence of an article on each of said conveying means at a distance ahead of said common point, the respective ratios of said distances to said speeds being equal, means coupled to each of said article detecting means for producing a retard signal only in response to simultaneous presence signals from two of said article detecting means, and means responsive to said retard signal for retarding the later detected one of said two articles.

3. In a system for supplying articles to a common point by means of a plurality of conveying means each moving at a respective speed, the improvement comprising an article detecting means for each of said conveying means for producing a signal in response to the presence of an article on said conveying means respectively, each of said article detecting means being positioned a predetermined distance from said common point to provide substantially equal ratios of said predetermined distances to the speeds of said conveying means respectively, means coupled to each of said article detecting means for producing a retard signal only in response to at least partially simultaneous presence signals from a plurality of said article detecting means, and means responsive to said retard signal for retarding the article associated with the later of said simultaneous presence signals.

4. In a system for supplying articles to a common point by means of a plurality of conveying means each moving at a respective speed, the improvement comprising article detecting means associated with each of said conveying means for indicating the presence of an article at predetermined distances ahead of said common point, the respective ratios of said distances to said speeds being equal, means coupled to said article detecting means for indicating the simultaneous detection of a plurality of said articles, and means coupled to said indicating means for speeding up the first of said detected articles only in response to said simultaneous detection of articles.

5. In a system for supplying articles to a common point by means of a plurality of conveying means each moving at a respective speed, the improvement comprising respective article detecting means for producing a signal in response to the presence of an article on each of said conveying means at a distance ahead of said common point, the respective ratios of said distances to said speeds being equal, means coupled to each of said article detecting means for producing an accelaration signal only in response to simultaneous presence signals from two of said article detecting means, and means responsive to said acceleration signal for speeding up the first detected one of said two articles.

6. In a system for supplying articles to a common point by means of a plurality of conveying means each moving at a respective speed, the improvement comprising an article detecting means for each of said conveying means for producing a signal in response to the presence of an article on said conveying means respectively, each of said article detecting means being positioned a predetermined distance from said common point to provide substantially equal ratios of said predetermined distances to the speeds of said conveying means respectively, means coupled to each of said article detecting means for producing an acceleration signal only in response to at least partially simultaneous presence signals from a plurality of said article detecting means, and means responsive to said acceleration signal for speeding up the article associated with the earlier of said simultaneous presence signals.

References Cited by the Examiner
UNITED STATES PATENTS
2,880,891  4/1959  Carroll _____ 198—78

SAMUEL F. COLEMAN, *Primary Examiner.*

ERNEST A. FALLER, *Examiner.*